Oct. 8, 1940.  A. G. WILSON ET AL  2,217,088
MEASURING INSTRUMENT
Filed Nov. 30, 1938    3 Sheets-Sheet 1

INVENTORS
Albert George Wilson
William Kesemann
BY
ATTORNEYS.

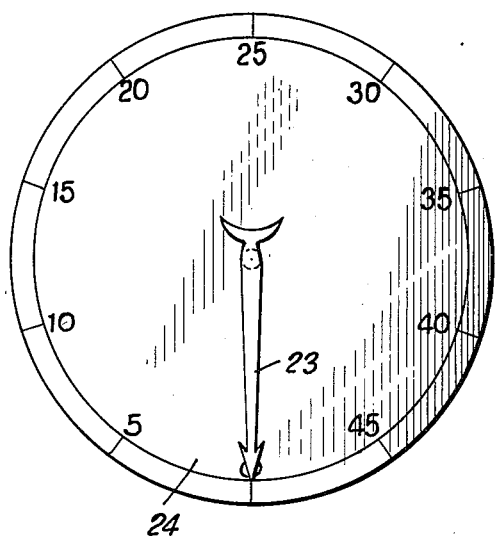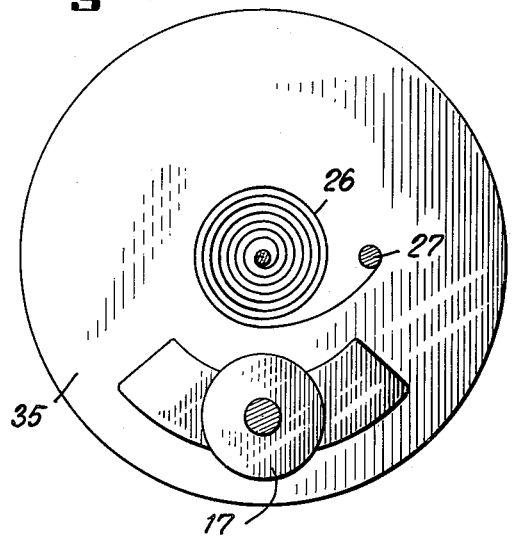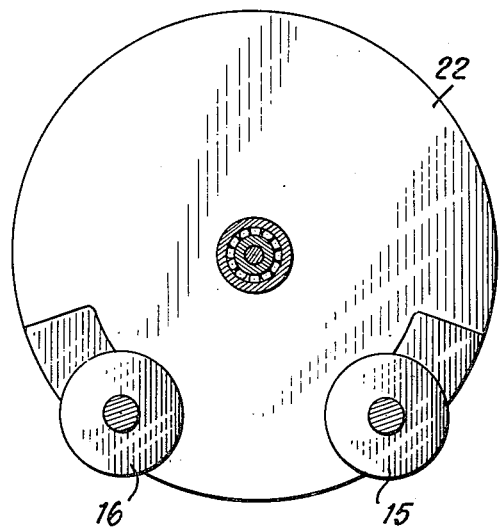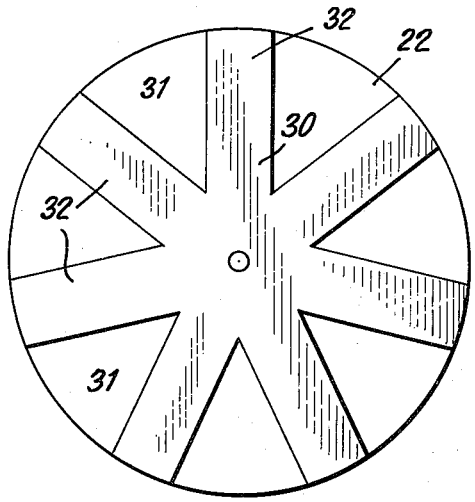

Oct. 8, 1940.  A. G. WILSON ET AL  2,217,088
MEASURING INSTRUMENT
Filed Nov. 30, 1938   3 Sheets—Sheet 3
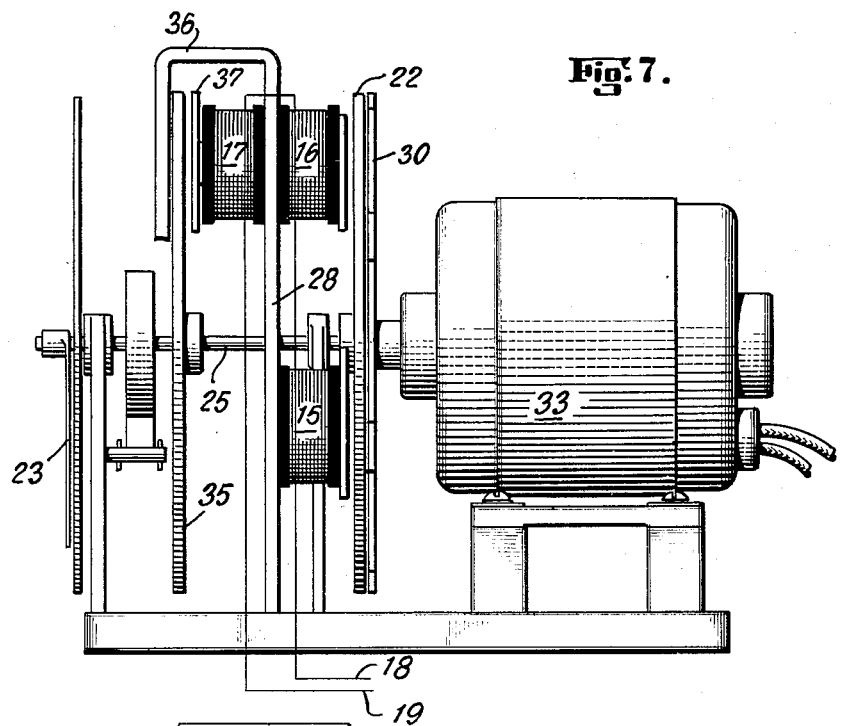
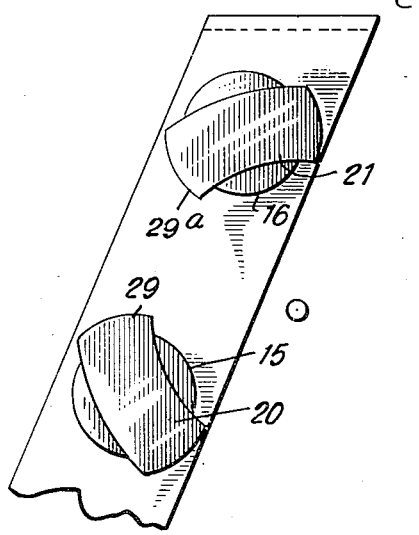
INVENTORS
Albert George Wilson
William Kesemann
BY
Emery, Varney, Whittemore & Dix
ATTORNEYS.

// Patented Oct. 8, 1940

2,217,088

UNITED STATES PATENT OFFICE 2,217,088

MEASURING INSTRUMENT

Albert George Wilson and William Kesemann, Ventura, Calif.; said Kesemann assignor to said Wilson Application November 30, 1938, Serial No. 243,234

17 Claims. (Cl. 171—95)

This invention relates to a measuring instrument, and more in particular the invention pertains to an improved form of electrically operated instrument especially adapted to indicate the horsepower developed by an automobile or truck that is driven on to a test machine from the street.

The novel indicating device will show readily, quickly and accurately the horsepower developed by the automobile or truck without in any way disassembling it or in adding any special attachments.

The preferred use of this novel measuring instrument will be described in connection with the measuring of horsepower of an automobile or truck, or the like, but it is to be understood that the improved instrument may be employed with other machines to indicate certain features or characteristics of those machines. For instance, the instrument with desired attaching apparatus may be employed to measure horsepower being delivered by other types of engines or devices. It may also be employed as a tachometer to indicate speed.

One of the desirable features of this invention is to provide a novel apparatus for accurately and quickly indicating a characteristic of a machine or mechanism to which it is attached. In the preferred example described herein, the novel apparatus is calibrated to indicate the horsepower developed by an automobile, truck or the like without in any way dismantling or modifying them.

Another feature of the invention is the provision of an improved apparatus of few parts and responding to electrical conditions and variations thereof for accurately indicating certain information or characteristics.

A further feature of this invention is the provision of an improved electrically operated indicating instrument that responds to the amount of electrical power input and not to any change of speed of moving parts within the instrument.

In this novel instrument or meter there is provided an improved structure for employing a small amount of electricity to give maximum indicating results, and it provides for a new and effective path for the flow of flux, and for an electrically operated dampening means that allows an indicating needle to come to rest almost immediately after a change in the input so that a true reading may be quickly and accurately made.

A still further feature of this invention is the provision of a series of electromagnets, arranged and connected together in a novel fashion and which cooperate with a rotating member that readily conduct electromagnetic flux, thus to give a correct indication of a characteristic or condition of the device being tested.

Other features and objects of the invention will be appreciated in the following detailed description.

The preferred embodiment of the invention herein is illustrated in the accompanying drawings wherein Fig. 1 is a top plan view of the preferred embodiment of the invention herein showing various parts thereof;

Fig. 3 is a view of the dial and indicator or needle as shown by a side view of the left end of the apparatus shown in Figs. 1 and 2;

Fig. 4 is a sectional view in part taken on the line 4—4 of Fig. 2;

Fig. 5 is a sectional view in part, taken on the line 5—5 of Fig. 2;

Fig. 6 is a view taken on the section lines 6—6 of Fig. 2;

Fig. 7 is a side view of a modified form of the apparatus having the invention incorporated therein; and Fig. 8 is a front view of electromagnetic pole pieces and extensions thereof and showing the radii of curvatures of the pole pieces.

In general, the invention herein is embodied in an apparatus which preferably comprises a plurality of electromagnets which receive varying amounts of electrical energy, and which in turn produce electromagnetic flux in varying amounts or quantities, depending upon the electrical energy supplied. Associated with the magnets is a member which reacts to the varying amounts of the magnetic flux flowing. This member is positioned near the electromagnets. An indicator is associated with this member and is movable thereby to indicate the amount of movement of the member. A suitable dial is calibrated in desired units and the indicator or needle moves thereover to show certain values, characteristics or information all in accord with the unit of calibration of the dial. In the invention herein a novel circuit of flux is provided showing that the movable member becomes truly responsive to the varying amounts of electrical energy supplied to the magnets.

It is to be noted that the measuring instrument, which is the preferred embodiment herein, responds accurately to the amount of electrical energy supplied and not by reason of changes in speed or movement or rotation of any of the parts of the apparatus.

The preferred measuring instrument herein is particularly adapted to be one portion of a complete apparatus for measuring horsepower developed by a truck or automobile that is driven on to or is associated with a mechanism which, during tests, develops varying amounts of electrical energy.

Preferably this developed electrical energy is conducted to the measuring instrument herein and directly to the electromagnets. By reason of the novel operation of this instrument, the correct indication of developed horsepower, speed, or other units or characteristics is readily read on the dial.

Figure 1:
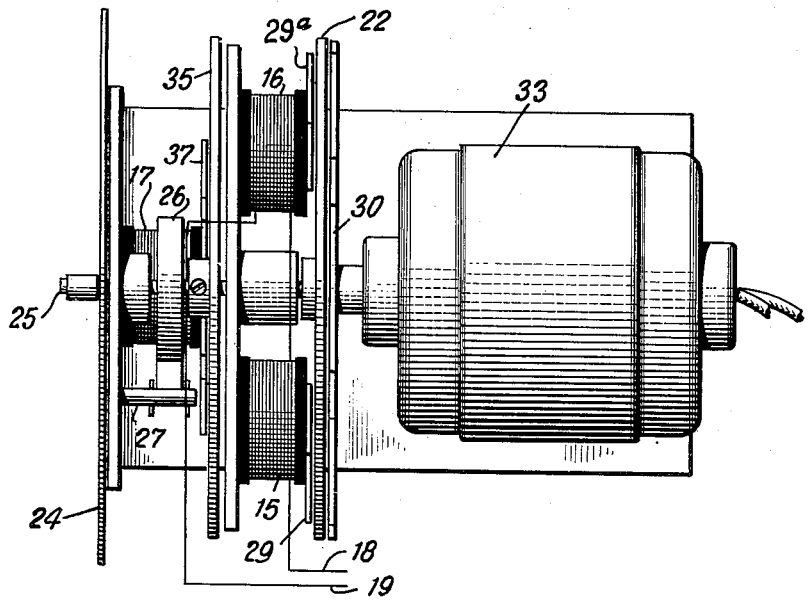
Figure 2:
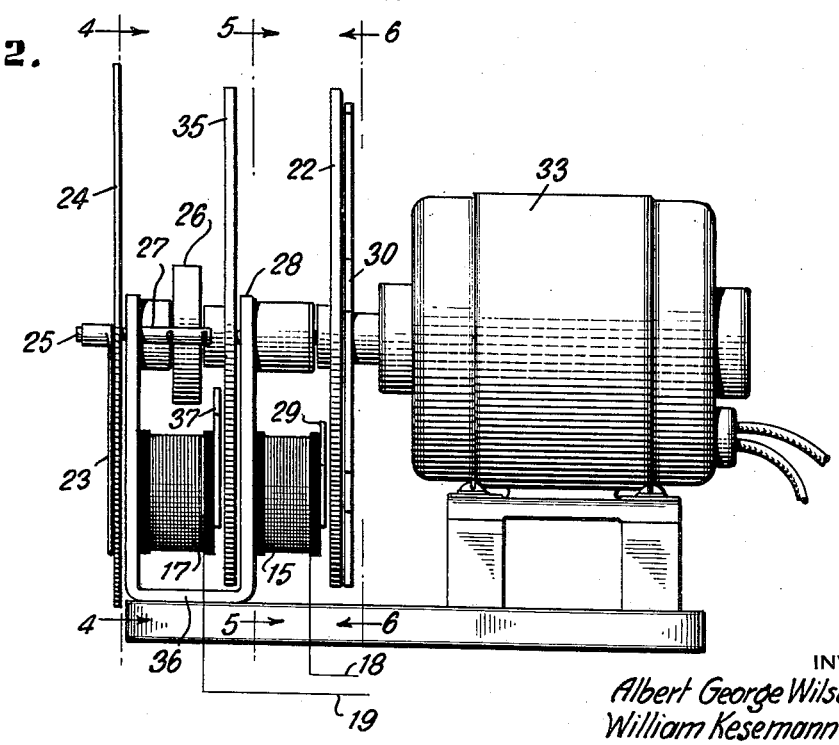
Fig. 2 is a side view of the apparatus shown in Fig. 1.

Referring now to the preferred apparatus herein, and referring particularly to Figs. 1 and 2, there is provided a plurality of electromagnets 15, 16, and 17, which are advantageously mounted in a suitable frame as indicated, preferably at the lower part thereof although there may be variations in the mounting of these magnets as indicated in Fig. 7.

These magnets receive electrical power through leads 18 and 19, and the magnets are preferably connected in series, although other types of connections may be made. The variations in the electrical power supply create magnetic flux in the magnets which flux flows through magnet core 20 of magnet 15 and core 21 of magnet 16.

A suitable member 22 responds or reacts to the flux developed in magnets 15 and 16 and is moved from its normal position in accordance with the variations of the amount of flux flowing. This member 22 will later, in the description, be called a disc.

This member 22 is suitably mounted in association with indicator or needle 23 which moves about dial 24 (Fig. 3). Preferably member 22 and needle 23 are mounted on the same shaft 25 so that any movements of the member 22 will vary the position of the needle 23 over the dial 24, thereby giving the desired reading of the instrument.

The member 22 may be of any suitable size or shape and may be made of any suitable material. Preferably the member is a thin disc of aluminum thereby constituting a light-weight member which offers little mechanical resistance to movement. When this disc or member 22 is mounted in a magnetic field, it is understood that eddy currents are set up within it and it moves from its normal position. If desired this member or disc 22 may be made of brass, copper, or any non-magnetic material in which eddy currents may be introduced when the disc is placed in the path of magnetic flux.

In the desired mounting of this disc 22 it is held in a normal position by any suitable means so that when the disc has been moved out of its normal position it will again return. The needle 23 will indicate zero, as shown in Fig. 3 when the disc is in its normal position. Any suitable resilient or other means may be employed for maintaining the disc 22 in its normal position and for resisting its movement from that position. In the form herein indicated the resilient means is preferably a spiral spring 26 as shown in Figs. 1, 2, and 4. One end of this spring is attached to the shaft 25 and the other end is affixed to a stud 27, as indicated in the same figures. Thus, the indicator and the member which moves it are simple in their constructions and mounting and readily indicate the value of the desired characteristic.

In the improved form of instrument herein it is desired to obtain the most efficient use of the magnetic flux produced by the magnets 15 and 16. For this purpose it is desired to connect similar ends of these two magnets by a metal flux conducting means 28, and to have the free ends of the cores of the magnets provided with extending pole pieces 29 and 29a, as shown in Fig. 8.

The extended pole pieces allow the magnetic flux to be distributed over a larger area of the member or disc 22 and they assist in directing, as much as possible, the flow of the entire flux in the circuit for which it is intended.

For further obtaining a more efficient effect of the flow and for developing an improved path for the flux, there is provided a suitable flux conducting mechanism preferably mounted in close proximity to the free ends of the magnets but on the outside of disc 22. Such a mechanism is herein shown as a rotor 30, illustrated in one form in Fig. 6. This rotor may have any desired form and may be made of any suitable material so long as it is efficiently conducting the magnetic flux. Preferably the rotor is made of steel. The preferred form of this rotor is a steel member having slots 31 therein which thereby form spokes 32. The depth of slots 31 may vary as desired. This rotor is adapted to move in front of the pole pieces of the magnets at a desired rate. It is preferred that the rotor be rotated at a uniform speed, as by a synchronous motor 33. It is also preferred that the diameter of the rotor approximates the diameter of the member or disc 22. It is further preferred that the lengths of the spokes 32 shall be such that they will extend a very small amount beyond the outer curved edge of the pole pieces 29 and 29a. In this preferred form of spoked rotor, it is desired that the axis of one spoke, at any instant, will be at the center of the pole piece 29 and that another of the spokes will have its axis at the center of the pole piece 29a, thus providing a very direct flux-transmitting means from one pole piece to another. Preferably the member 22 is positioned equidistant between the pole pieces of the magnets and the rotor 30.

In the apparatus herein the needle will rest at zero when the leads 18 and 19 are not conducting electricity even though element 30 is rotating and even though there is some residual magnetism in the magnets 15 and 16.

In the type of rotor employed herein it is desired to have an uneven number of spokes. The reason for this is based upon a theory which, as understood at this time, eliminates harmonics and eliminates duplicate flux circuits. This theory may not be the proper theory but in any event the operation of this rotor and the efficient transmission of flux, has been very satisfactory.

The flux cycle or complete path may be noted as passing from core 20 of electromagnet 15 to pole piece 29 and passing from there through disc 22 to the rotor 30, and from there back again through disc 22 to pole piece 29a of magnet 16, and through core 21 of that magnet to the metal flux conducting means 28 back to the other end of core 20 of magnet 15, thereby giving a complete flux path or cycle with a minimum amount of air space therein, while still having the flux pass through a disc 22 so that it will react and move out of its normal position to give an indication of the characteristic to be measured. In the general example herein it will indicate the horsepower developed by the automobile, or truck, or engine, or other moving part being tested.

In obtaining the most efficient flow of flux it is desired to mount some of the magnets about a center as is indicated in Fig. 8. With the disc 22 being round and the rotor 30 being round, it is preferred to have some of the magnets positioned equidistant from a center that is an axis in which fall the centers of the disc 22 and rotor 30; thus the shaft 25 and the shaft carrying the rotor 30 are in line.

In many of the measuring instruments it is desired to have suitable means for dampening the movement of the needle 23. These dampening means may be of any desired structure to perform the necessary function. In the preferred form herein the dampening means operates with varying intensities, which vary with the variations in the amount of electrical energy supplied to coils 15 and 16.

In carrying out the preferred form of structure for accomplishing the desired result herein the coil 17 is provided and is preferably electrically connected with coils 15 and 16 so as to produce increased or decreased magnetic flux flow depending upon the electrical energy supplied to the coils. The magnetic flux produced by the coil 17 reacts on a member or disc 35 which is mounted on shaft 25, and acts to dampen or substantially eliminate any fluctuations in the needle 23 after the needle has moved to a new position.

It is preferred that the magnet 17 be connected in series with the magnets 15 and 16. It is also preferred that the member 35 shall be a thin disc of aluminum which has reactions set up therein in substantially the same manner as the reactions set up in disc 22.

In making coil 17 most effective it is desired that it have a flux conducting means 36 which extends from one end of the magnet core around to the front of the other end of the magnet core of this magnet, as is particularly indicated in Fig. 7. In addition it is preferred that the flux conducting means 36 shall join flux conducting means 28, either by being a part of an integral strip as shown in Figs. 1, 2, and 7, or it may be a separate member which may, or may not be attached to the flux conducting means 28. In the preferred example herein it is desired that the flux conducting means 28 and 36 shall be a continuous piece as indicated. The front end of the core magnet 17 is provided with an extended pole piece 37 which preferably takes the form of the pole pieces 29 and 29a of magnets 15 and 16 respectively. The disc 35, it will be noted, is positioned between the flux conducting portion 36 and the pole piece 37, and the construction is such as to allow minimum air gap. It is desired to have the disc 35 positioned midway in the distance between flux conducting means 36 and pole piece 37.

As in the curved structure of pole pieces 29 and 29a, pole piece 37 assists in directing the maximum amount of flux through the circuit intended, i. e., from pole piece 37 through disc 35, to flux conducting means 36 and around to the other end of the core of magnet 17.

In the operation of the movement of disc 35 it will be noted that it functions to dead-beat or dampen the pointer or needle and hold it still so that accurate readings on the dial may be quickly made.

It will be noted that the disc 35 is located on shaft 25 so that it dampens the movement of the fluctuations of the shaft which carries the operating disc 22.

It will be noted from the foregoing description that the improved instrument herein functions by reason of the variations in the supply of electrical energy, and not by reason of changes of speed of any of the parts of the apparatus.

It will also be noted that there are a series of electromagnets for receiving the electrical energy, and that there is an improved flux circuit by reason of the provision of a flux conducting rotor operating in close proximity to at least two magnet pole pieces so that there is a direct flux conducting path of low resistance between the free ends of the pole pieces of the magnets.

It is preferred to have extended or large size pole pieces so that, as far as possible, the entire flux is directed through the circuit for which it is intended. These larger size pole pieces cooperate with the rotor 30 to give a much more efficient transfer to the flux. Thus, the instrument is more sensitive to small variations in the electrical energy supplied and will translate these variations to the needle 23.

An effective feature of this instrument is the particular type of dampening means which brings the needle to rest quickly and the effectiveness of this dampening means increases or decreases as the electrical energy increases and decreases in the electromagnets.

Another particular feature of the invention is the construction of the rotating flux conducting means. The preferred construction herein eliminates harmonics or duplicate flux circuits. This is readily accomplished by having an odd number of blades in the rotating element. Also, the extended pole pieces assist in the elimination of harmonics and duplicate flux circuits.

It is also desired, in the improved structure herein, to have the center of rotation of the flux conducting element 30 mounted in line, or in the same axis that supports the disc 22. This eliminates the effect of a material amount of magnetic flux flowing in an undesired direction. For this same purpose it is desired that the pole pieces of the magnets be curved and that the radius of curvature be about a center which is the center of location of several of the magnets. The pull of the rotor is usually in direct proportion to the amount of flux passing through the magnet circuit. This, however, may be varied to some extent.

In the preferred structure herein the normal position of the disc 22 is such that the entire mounting on the same shaft will register zero when there is no energy being supplied to the electromagnets 15, 16, and 17. This means that the residual magnetism in the coils and any air currents set up by the rotation of the flux conducting element 30 will not move the disc 22 out of its normal position.

It will be understood that various modifications and changes may be made in the structure herein for the purpose of performing the same function, but it is to be understood that such changes and modifications come within the invention as outlined by the following claims.

We claim:

1. In a measuring instrument, the combination of an electromagnet for producing varying amounts of magnetic flux when varying electrical energy is supplied thereto, a flux conducting element mounted in close proximity to one end of said magnet and adapted to be moved at intervals past said end of the magnet, a member mounted between the end of said magnet and said flux conducting element and adapted to be moved out of its normal position as magnetic flux flows therethrough between said flux conducting element and said magnet, means for maintaining said member in a normal position and for resisting its movement out of normal position, and an indicator for said instrument mounted to be moved by said member.

2. In a measuring instrument, the combination of a magnet for receiving and responding to varying electrical energy to produce varying amounts of magnetic flux, said electrical energy being produced by means operated by a device under test, a magnetic flux conducting element mounted closely to one end of said magnet, means for moving said element past said end of the magnet at a uniform rate, a disc mounted between said magnet and said flux conducting element, and having flux pass therethrough, said disc adapted to be moved to a greater or less extent by reason of the amount of magnetic flux passing from said end of the magnet to said flux conducting element, resilient means for maintaining said disc in a neutral position and for opposing movement therefrom, and an indicator associated with said disc and adapted to be moved thereby.

3. In a measuring instrument, the combination of an electromagnet for receiving varying amounts of electricity thereby producing varying amounts of magnetic flux, a flux conducting element rotated at uniform speed and being positioned to receive magnetic flux from one end of said magnet, and a disc mounted between said end of the magnet and said flux conducting element, said disc having the flux pass therethrough and being moved to a greater or less extent by the variations in the amount of said flux, resilient means for maintaining said disc in a normal position and for resisting its movement therefrom, and an indicator mounted to be moved by said disc.

4. In a measuring instrument, the combination of two electromagnets having one end of the cores of said magnets connected together by metal flux conducting means, a flux conducting element extending between the unconnected ends of said electromagnets but not touching the same, said flux conducting element adapted to be moved past the free ends of said magnets at a uniform rate, a member mounted between said free core ends of said magnets and said flux conducting element and adapted to be moved by the amount of flux passing through said member from one free core end to the flux conducting element and then to the other free core end, means for maintaining said disc in normal position and for resisting its movement therefrom, and an indicator mounted to be moved by said disc.

5. In a measuring instrument, the combination of two electromagnets, a metal flux conducting means connecting similar ends of the magnets, a magnetic flux conducting element mounted in proximity to the free ends of said magnets, said element mounted to be rotated at a uniform speed, a disc mounted between said magnets and said flux conducting element and adapted to be moved out of its normal position to a greater or less extent by reason of the amounts of flux passing therethrough, means for holding said disc in a normal position and for resisting movement therefrom, an indicator associated with said disc and movable to indicate the amount of movement of said disc, said electromagnets being supplied with varying amounts of electrical energy, said magnets and said flux conducting element forming a magnetic flux path from one magnet through said disc and then to and through said element and back through said disc at another point to the second magnet and through the second magnet and the metal conducting means to the other end of said first magnet.

6. In a measuring instrument, the combination of a plurality of electromagnets for receiving varying amounts of electrical energy to thereby produce varying amounts of magnetic flux, a metal flux conducting means connecting similar ends of said electromagnets, a flux conducting element mounted in proximity to the free ends of said magnets but not touching the same, said element being rotated at a definite rate in front of said free ends of said magnets, a solid disc mounted between said free ends of the magnets and said flux conducting element, the axis of mounting of said disc being in line with the axis of mounting of said flux conducting element, said disc adapted to have eddy currents set up therein as magnetic flux passes to and from the free ends of said magnets to said flux conducting element.

7. In a measuring instrument, the combination of electromagnets, core pieces therefor, a flux conducting means connecting similar ends of said core pieces, extending pole pieces mounted on the free ends of the core pieces of said magnets, a flux conducting element mounted in proximity to said pole pieces but not touching the same, said element being rotated at a definite rate in front of said pole pieces, a solid disc mounted between said pole pieces and said flux conducting element, the axis of mounting of said disc being in line with the axis of mounting said flux conducting element, said disc adapted to have eddy currents set up therein as magnetic flux passes therethrough to and from said flux conducting element.

8. In a measuring instrument, the combination of electromagnets, core pieces therefor, a flux conducting means connecting similar ends of said core pieces, extended pole pieces mounted on the free ends of the core pieces of said magnets and being curved from a center, a flux conducting element positioned in proximity to said curved pole pieces, the axis of mounting of said element being the center of curvature of said curved extended pole pieces, said conducting element being rotated at a uniform speed, a disc mounted between said pole pieces and said flux conducting element and adapted to be moved by reason of the amount of flux passing from one pole piece to said flux conducting element and back through said disc to another pole piece, said disc being mounted in an axis in line with the axis of said flux conducting element, means for holding said disc in a normal position and for resisting its movement therefrom, and a pointer carried by a shaft which supports said disc.

9. In a measuring instrument, the combination of electromagnets for receiving varying amounts of electrical energy to produce varying amounts of magnetic flux, metal flux conducting means for connecting similar ends of said electromagnets, a flux conducting element mounted in proximity to the free ends of said electromagnets and adapted to be rotated at a constant speed, said element adapted to have portions thereof positioned near the center of the core pieces of said magnets for conducting magnetic flux from the free end of one magnet to the free end of another magnet, a disc mounted between the free ends of said magnets and said flux conducting element and adapted to be moved to varying extents from a normal position by reason of the amount of magnetic flux passing through said disc between the pole pieces and said rotating element, and an indicator associated with said disc for indicating the amount of movement from the normal position of said disc.

10. In a measuring instrument, as defined by claim 4, in which the magnetic flux conducting element has slots therein which form spokes, the lengths of which extend at least to the center of the core pieces of said magnets.

11. In a measuring instrument as defined by claim 4 and in which said flux conducting element forms a series of spokes uneven in number and spaced to have any two spokes cover the centers of the pole pieces of said magnets at a given instant, said disc being solid aluminum.

12. In a measuring instrument, the combination of an electromagnet for producing varying amounts of magnetic flux when varying electrical energy is supplied thereto, a flux conducting element mounted in close proximity to one end of said magnet and adapted to be moved at intervals past said end of the magnet, a member mounted between the end of said magnet and said flux conducting element and adapted to be moved out of its normal position as magnetic flux flows therethrough between said flux conducting element and said magnet, means for maintaining said member in a normal position and for resisting its movement out of normal position, and an indicator for said instrument mounted to be moved by said member, and magnetic dampening means for maintaining said disc and said indicator from fluctuating to any material extent after being moved to a new position.

13. In a measuring instrument, the combination of an electromagnet for producing varying amounts of magnetic flux when varying electrical energy is supplied thereto, a flux conducting element mounted in close proximity to one end of said magnet and adapted to be moved at intervals past said end of the magnet, a member mounted between the end of said magnet and said flux conducting element and adapted to be moved out of its normal position as magnetic flux flows therethrough between said flux conducting element and said magnet, means for maintaining said member in a normal position and for resisting its movement out of normal position, and an indicator for said instrument mounted to be moved by said member, and an electromagnet dampening means connected to the support for said member to prevent said support from having material fluctuations after changes in the electrical energy supplied to said magnet.

14. In a measuring instrument as defined in claim 9 and in which there is a dampening means comprising a third electromagnet connected in series with the other electromagnets, a metal flux conducting means at one end of this third magnet and joining the metal flux conducting means between the ends of said first magnets and extending to a position in front of the free end of said third magnet, an extended pole piece for the free end of said third magnet, an aluminum disc mounted between said extended flux conducting means and said extended pole piece, said aluminum disc being associated with the moving support for said first disc, and a spring for maintaining said shaft in normal position and for resisting its movement therefrom.

15. In a measuring instrument the combination of a plurality of electromagnets connected in series and receiving varying amounts of electrical energy for producing varying amounts of magnetic flux, similar ends of said magnets being connected by a flux conducting means, said flux conducting means extending to a position in front of the free end of one of said magnets, two of said magnets being positioned equidistant from a center, extending pole pieces mounted on the free ends of said two magnets, said pole pieces being curved from a point coinciding with said center, a spoked magnetic flux conductor mounted along the axis of said center and in proximity to the extended pole pieces of said magnets, said spoked element being driven at a uniform speed of rotation, a thin solid aluminum disc mounted between the pole pieces of said two magnets and said rotating element, a shaft for supporting said disc, said disc adapted to be moved by reason of the varying amounts of magnetic flux passing from one pole piece to said spoked element and back to the pole piece of the second magnet, an indicator mounted on said shaft for indicating the movement of said disc, a spring means attached to said shaft for maintaining said indicator in a predetermined position and for resisting the movement therefrom, a second disc mounted on said shaft and extending between the pole piece of the third magnet and the extended flux conducting means, said second disc acting to prevent fluctuations in the oscillations of said shaft after changes have been made in the electrical energy supplied to said magnets.

16. In a measuring instrument the combination of a plurality of electromagnets for producing varying amounts of magnetic flux when varying electrical energy is supplied thereto, a flux conducting element mounted in proximity to similar ends of said magnets, said element being driven at a uniform speed in front of said magnets, a disc mounted between the ends of said magnets and said flux conducting element and adapted to be moved from its normal position by the variations in magnetic flux passing therethrough and not by air currents set up by the rotation of said flux conducting element, and an indicator mounted in association with said disc and movable therewith to indicate the amount of movement of said disc.

17. In a measuring instrument as defined in claim 16 characterized by the fact that the axis of support of said disc shall be in the same line as that of said rotating flux conducting element.

ALBERT GEORGE WILSON.
WILLIAM KESEMANN.